United States Patent
Shimobayashi et al.

[11] Patent Number: 5,968,446
[45] Date of Patent: Oct. 19, 1999

[54] MOLDED RESIN BODY AND METHOD FOR PRODUCING THE SAME

[75] Inventors: Teiji Shimobayashi; Tetsumi Ichioka; Kenji Sugiyama; Yasunobu Teramoto, all of Aichi, Japan

[73] Assignee: Toyoda Gosei Co., Ltd., Nishikasugai-gun, Japan

[21] Appl. No.: 08/509,895

[22] Filed: Aug. 1, 1995

Related U.S. Application Data

[62] Division of application No. 08/141,725, Oct. 27, 1993, abandoned.

[30] Foreign Application Priority Data

Oct. 28, 1992 [JP] Japan .................................. 4-313006
Oct. 30, 1992 [JP] Japan .................................. 4-316169
Oct. 30, 1992 [JP] Japan .................................. 4-316170

[51] Int. Cl.$^6$ .................................................. B29C 45/00
[52] U.S. Cl. ........................................ 264/572; 425/130
[58] Field of Search .............................. 264/572; 425/130

[56] References Cited

U.S. PATENT DOCUMENTS

| | | | |
|---|---|---|---|
| 3,961,113 | 12/1976 | Marco | 428/35 |
| 4,187,390 | 2/1980 | Gore | 174/102 R |
| 4,581,390 | 4/1986 | Flynn | 523/112 |
| 4,835,003 | 5/1989 | Becker et al. | 427/2 |
| 4,931,329 | 6/1990 | Sun | 428/36.92 |
| 4,968,474 | 11/1990 | Ito | 264/513 |
| 5,037,684 | 8/1991 | Dundas et al. | 428/36.92 |
| 5,090,886 | 2/1992 | Jaroschek | 264/572 |
| 5,198,177 | 3/1993 | Sugiyama et al. | 264/572 |
| 5,213,860 | 5/1993 | Laing | 428/36.92 |
| 5,245,779 | 2/1993 | Suzue et al. | 43/18.5 |
| 5,254,306 | 10/1993 | Inada et al. | 264/572 |
| 5,262,105 | 11/1993 | Komiyama et al. | 264/85 |
| 5,295,801 | 3/1994 | Sigiyama et al. | 425/130 |
| 5,304,341 | 4/1994 | Shah | 264/572 |
| 5,324,189 | 6/1994 | Hendry | 264/572 |
| 5,328,742 | 7/1994 | Tukihara | 428/105 |
| 5,395,582 | 3/1995 | Shigeno et al. | 264/572 |

FOREIGN PATENT DOCUMENTS 50-71756  6/1975  Japan ................................. 264/572

*Primary Examiner*—Catherine Timm
*Attorney, Agent, or Firm*—Pillsbury Madison & Sutro, LLP

[57] ABSTRACT

A method of molding a hollow body to make the body nearly uniform in thickness around an internal opening thereof. A weir is provided in a central part of an opening portion of the mold cavity near an upstream side of the opening portion with respect to the direction of flow of a resin. Molten resin is injected into the cavity, and pressurized gas is thereafter injected into the molten resin in the cavity to make the internal opening in the resin. Since the weir is provided, the resin comes into uniform contact with the inner mold surface of the die at the opening portion as the resin flows into opening portion. The resin is uniformly cooled and solidified, starting with the inner surface and working inwardly, so that the hollow body is made nearly uniform in thickness around the internal opening.

12 Claims, 10 Drawing Sheets

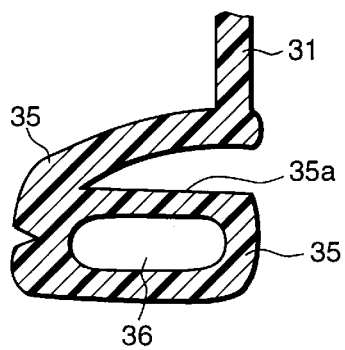
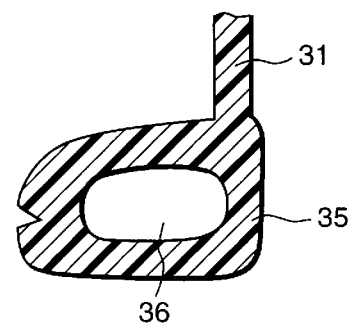
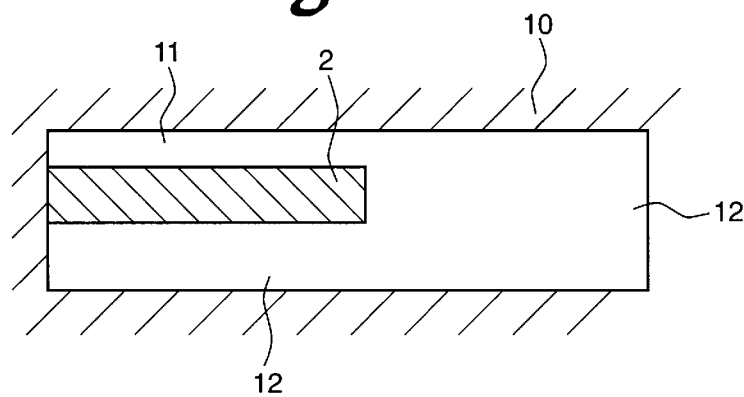
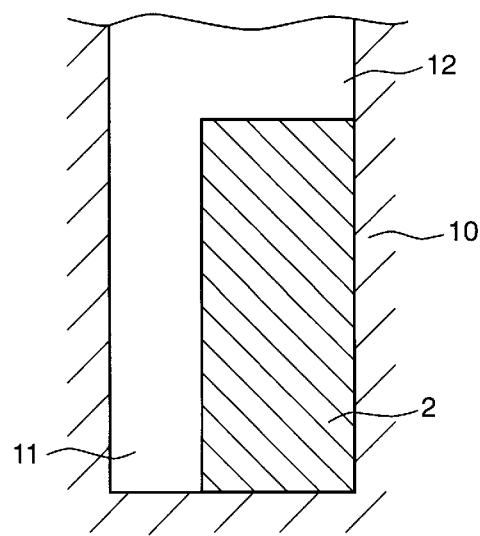

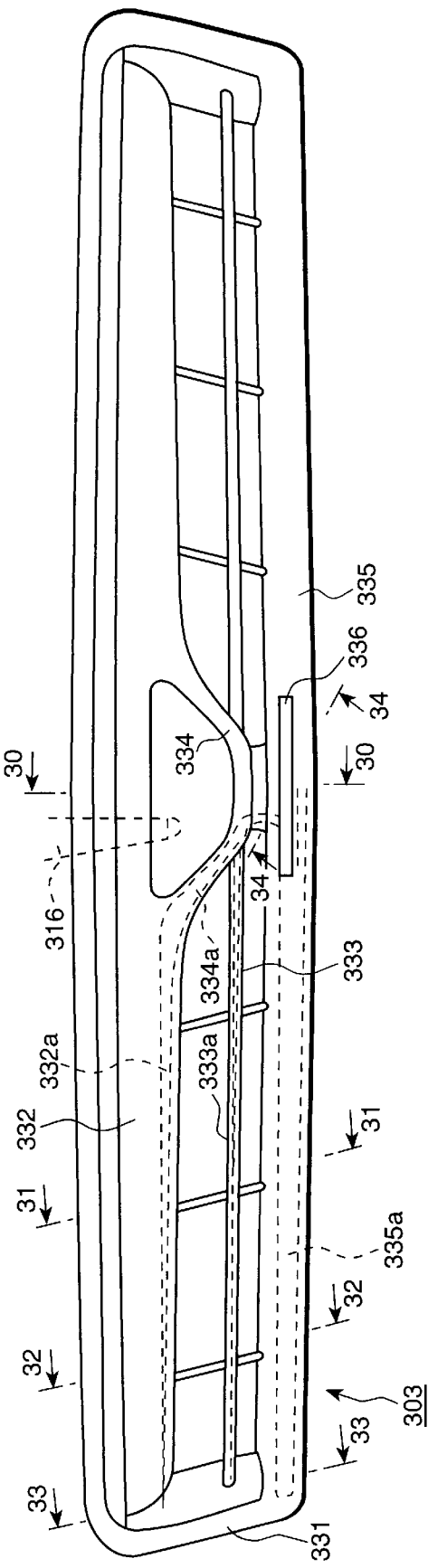

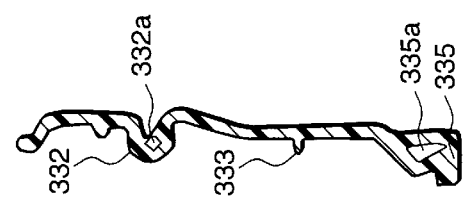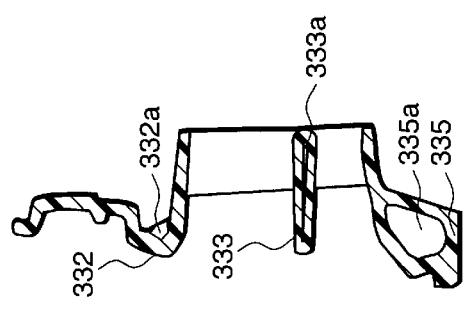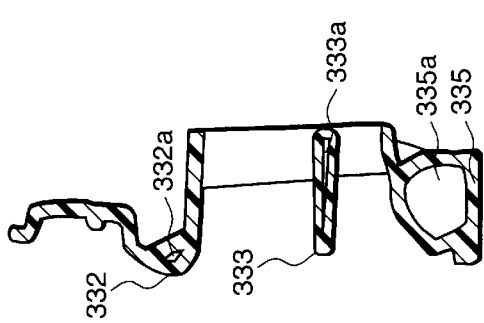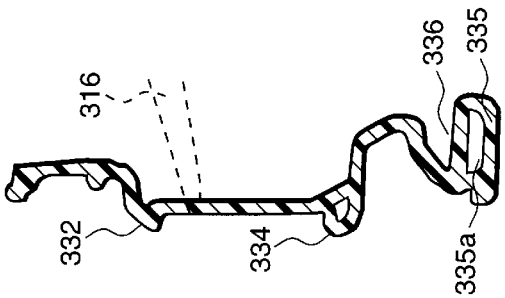

MOLDED RESIN BODY AND METHOD FOR PRODUCING THE SAME

This is a division of application Ser. No. 08/141,725, filed Oct. 27, 1993, now abandoned.

BACKGROUND OF THE INVENTION

This invention has priority rights based on Japanese Patent Application No. 4-313006 filed Oct. 28, 1992, the contents of which are hereby incorporated by reference.

1. Field of the Invention

The present invention relates to a method for molding a hollow body having an internal opening in a portion of the body and being nearly uniform in thickness around the opening. The present invention also relates to a radiator grille having less weight and a better appearance than conventional grilles.

2. Description of the Related Art

As shown in FIG. 17, a radiator grille 9 for a motor vehicle is conventionally molded from resin, and includes frame 90 and an inner portion 91 located inside the frame. It can be seen in FIGS. 17 and 18, that an internal opening 95 is provided in a lower portion 92 of the frame 90 so as to extend in the longitudinal direction of the lower portion 92. The purpose of providing the internal opening 95 in the grille 9 is to reduce the weight thereof and diminish the required quantity of resin to conserve natural resources. To provide the internal opening 95 in the grille 9 in a conventional method, pressurized gas is injected into the molten resin after the resin is injected into the cavity of a molding die. FIGS. 20 and 21 show the steps of the method of providing the internal opening 95 The resin 7 is injected into an opening gate 85 forming part of a cavity 81 of the molding die 8. The pressurized gas is thereafter injected into the molten resin 7 through the gate 85 so that an internal opening 95 is made in the resin, as shown in FIG. 21.

Although it is desirable for the internal opening 95 to be formed in the central part of the lower portion 92 of frame 90 to make the lower portion nearly uniform in thickness around the opening, it is likely that gravity will cause the upper part 95a as shown in FIG. 19, to be made smaller in thickness than the lower part 95b and side part 95c. Thus, the lower portion 92 is made nonuniform in thickness. The upper part 95a is sometimes made to be quite thin especially at the very center of lower portion 92 as shown in FIG. 19 and thus lacks strength. Therefore, the lower portion 92 needs to be made uniformly large in thickness. Such a problem occurs not only in the radiator grille but also in other hollow molded bodies such as the upper portion of a louver cowl.

A first aspect of the present invention is intended to solve the above-mentioned problem.

In addition, another problem exists in conventional radiator grilles. As shown in FIGS. 22 and 23 a conventional radiator grille 109 is secured by bolts 108 at the front of the engine space of a motor vehicle. The grille 109 includes a securing portion 190, an upper portion 191, a lower portion 192, inner portions 193, a lower ornamental portion 194, an upper ornamental portion 195, and side portions 197. The hood 107 of the vehicle is provided over the engine space so that the hood can be opened and closed. Another conventional radiator grille is secured to the central front portion of the hood of the motor vehicle so that the grille is moved up and down as the hood is opened and closed. Since these grilles are made of a die-cast zinc alloy, they are heavy. To eliminate this disadvantage, the radiator grille is made of resin to weigh less. However, a radiator grille made of the resin is not rigid or strong enough to maintain reliable prolonged use.

A second aspect of the present invention is intended to solve the above-mentioned problems.

A third problem will now be addressed. As shown in FIG. 26, a motor vehicle has a radiator grille 209 at the front thereof. The grille 209 is disposed in front of a radiator for cooling the cooling water of the engine of the vehicle, and plays an important role in improving the appearance of the front of the vehicle. The front of the lower portion 293 of the frame of the grille 209 has an ornamentation 298 for improving the appearance of the lower portion. The ornamentation 298 can be any type of design, such as a flowery pattern, characters, symbols or the like. The frame has side portions 291. The grille 209 is molded of a molded resin so as to weigh less. During the molding process, molten resin is injected into the cavity of a molding die. In order to properly transfer the form of the ornamentation molding portion of the cavity to the lower portion 293 of the grille frame, a pressurized gas is injected into the cavity for the lower portion of the frame after the resin is injected into the cavity. As a result, the molten or soft resin in the cavity is pushed by the pressurized gas so that the form of the ornamentation molding portion of the cavity is properly transferred to the lower portion 293 of the grille frame. As shown in FIGS. 27 and 28, the lower portion 293 has a hollow slender part 208 formed where the gas is injected at gate 281. The resin and the gas are sequentially injected into the cavity through the gate 281. A hollow body molding method is thus utilized to properly transfer the form of the ornamentation molding portion of the cavity to the grille 209.

The resin traveling through internal opening 280 of the hollow slender part 208 sometimes occupies too much of opening 280 (e.g. see numeral 285 in FIG. 28) even though pressurized gas is injected so that the opening 280 does not extend far enough. While resin is pushed by the pressurized gas through the internal opening 280 in order to transfer the form of the ornamentation molding portion of the cavity to the front of the lower portion 293 of the frame of the radiator grille 209, if the resin is not pushed by the gas far enough through the opening 280, the form of the ornamental molding portion will not be transferred to the front of the lower portion 293. This causes the lower portion 293 to have a poor appearance. In order for the internal opening 280 to extend far enough through the resin so that the leading end 285 of the opening reaches the furthermost end 250 of the lower portion 293, the injected quantity of the resin must be controlled so that the resin does not occupy too much of the cavity. In other words, the injected quantity of the resin needs to be controlled as it is injected into the part of the cavity for the hollow slender part 208 of the lower portion 293 before the injection of the gas into the resin in the part. However, since the amount of the cavity which is filled with the resin is not monitored as the resin is injected therein, too much resin is likely to be injected, depending on conditions such as the temperature in the hollow slender part 208 and the form thereof. Since the amount of resin which is injected depends upon such conditions and the like, it is difficult to control the injected quantity of the resin at the time of the injection into the cavity. This is problematic as stated above.

In addition, in the case where the leading end 285 of the internal opening 280 does not reach the vicinity of the furthermost end 250 of the lower portion 293, there is a possibility that a sink mark 299 will be made on the outer surface of a portion which does not have an internal opening as shown in FIG. 28. Since the injected gas does not reach the furthermost end 250 of the lower portion 293 and the end portion 250 is not sufficiently subjected to an internal pressure of the gas, a sink mark 299 is generated on the outer surface thereof. This is also problematic as stated above.

A third aspect of the present invention is intended to solve the above-mentioned problems.

SUMMARY OF THE INVENTION

It is an object of the first aspect of the present invention to provide a method of molding a hollow body so that it is made nearly uniform in thickness around the internal opening of the body.

The method of molding a body having an internal hollow portion comprises molding the body by flowing resin through an injection gate and into a mold having both an entrance port associated with the injection gate and an inner mold surface defining a cavity. The mold comprises a weir which extends laterally over an upstream region of the cavity so as to be coextensive with the upstream region, yet not over a downstream region of the cavity laterally spaced from the entrance port and laterally adjacent the weir. The weir divides the upstream region of the cavity into a receiving region and a main body region; the main body region is in communication with and is disposed below and downstream from the receiving region. The receiving region is disposed below the entrance port and above the weir. The weir is disposed in proximity to the entrance port to intercept resin Slowing through the entrance port. The weir is constructed and arranged to pass the resin along a downward direction from the receiving region to the main body region, so that, at least during a portion of the process, the resin follows a path in which it passes evenly and uniformly over an end surface portion of the weir and through the main body region before flowing laterally into the downstream region and thereby solidifies uniformly on the inner mold surface so that no flow mark is created. The method further comprises the step of pressurizing the cavity with gas to form an internal hollow portion in a portion of the body molded in the downstream region and the main body region, yet not in another portion of the body molded in the receiving region.

An important feature of the method is that the weir is provided near the upstream portion of the opening with respect to the flow direction of the resin and gas and extends in the longitudinal direction of the internal opening in order to help form the hollow body of resin. It is preferable that the length of the weir is equal to 8% to 60% of the internal opening portion. If the length of the weir is less than 8% of that of the opening portion, the hollow body may be made nonuniform in thickness around the internal opening. If the length of the weir occupies more than 60% of the length of the opening portion, the internal opening is likely to be filled with resin. It is preferable that the width of the weir be equal to 25 to 75% of that of the portion. If the width of the weir is less than 25% of that of the portion, the hollow body may be made nonuniform in thickness around the internal opening. If the width of the weir is more than 75% of that of the opening portion, the gap between the respective top of the weir and the opening portion is too small to allow the resin to flow through the gap. It is preferable that the height of the weir be not more than 40% of that of the opening portion. If the height of the weir is more than 40% of that of the opening portion, the distance between the top of the weir and the opening portion is likely to be too small to make the hollow portion of the body be of sufficient strength. It is preferable that the weir be disposed between a resin inflow passage and the lower part of the internal opening portion so that the resin does not directly flow down into the lower part but rather flows into the lower part around the weir.

The resin can be a polypropylene resin, an acrlonitrile-butadienestyrene resin, a polycarbonate resin, an acrylonitrile-ethylenepropylene-rubber-styrene resin or the like.

The hollow body may be a radiator grille having an internal opening only in one of the side, upper or lower portions of the frame of the grille or alternatively can be a grille with internal openings in other combinations of such portions of the frame.

Since the weir is provided in the internal opening portion, the leading portion of the molten resin injected into the cavity of the molding die through the gate thereof first comes into contact with the weir so as to be slowed down. The resin then flows into the lower part of the internal opening portion through the gap between the top of the weir and the opening portion. Since the cross-sectional area of the upstream part of the opening portion, on which the weir is provided, is smaller than that of the downstream part of the opening portion, on which the weir is not provided, the resin comes into uniform contact with the inner surface of the molding die on the upstream part as the resin flows from the upstream part to the downstream part in the longitudinal direction of the opening portion. Coming into uniform contact with the inner surface, the resin is gradually cooled and solidified so that the thickness of the solidified resin on the surface increases. Since the uniform flow of the resin in the upstream part of the opening portion in the longitudinal direction thereof enters directly into the downstream part of the portion, the resin comes into uniform contact with the inner surface of the molding die on the downstream part so that the resin is gradually cooled and solidified on the inner surface. Since the resin is thus uniformly cooled and solidified on the inner surface before the pressurized gas is injected into the still molten resin in the cavity of the die, the internal opening can be made in the central part of the internal opening portion by the injection of gas into the resin such that the hollow body is made nearly uniform in thickness around the internal opening. On the other hand, as shown in FIG. 20 in the conventional method, since the leading portion 72 of the resin 7 flows down directly into the internal opening portion 81 of the cavity of die 8, the resin is cooled earlier and solidified on the bottom and side parts of the inner surface of the die around the portion near the inflow part thereof rather than on other parts of the inner surface not near the inflow part. Therefore, in the conventional method, the thickness of the solidified resin is larger on the parts of the inner surface which are closer to the inflow Dart than on the parts farther away. For that reason, the quantity of resin 7 still molten at the time of pressurized gas injection into the cavity of the die 8 is so small that hollow body 9 is thinner on the top and side parts of the inner surface of the body around the internal opening 95, near the inflow part, than on other parts of the inner surface away from the inflow part.

In the method provided in accordance with a first aspect of the present invention, the hollow body is molded from resin so that the nonuniform distribution of the resin in the cavity of the molding die is prevented and causes the body to become nearly uniform in thickness around the internal opening as described above.

In addition, it is an object of a second aspect of the present invention to provide a radiator grille which is smaller in weight and better in appearance since it does not have a sink mark on the ornamental surface of the grille The radiator grille includes inner portions, an upper portion located over the inner portions, and a lower portion located under the inner portions. The grille is characterized in that the upper and the lower portions have first internal openings, and the inner portions have second internal openings communicating with the first openings. The inner portions are made of vertical rods, a combination of vertical and horizontal rods rectangularly crossing one another, or the like.

The radiator grille can be made of a resin such as acrylonitrile-butadiene-styrene, polypropylene, polycarbonate or acrylonitrile-ethylene-propylene-diene-rubber-styrene through injection molding. After the molten resin is injected into the cavity of a molding die, a pressurized fluid such as nitrogen gas, air or water is injected into the molten resin to make the internal openings. At that time, the fluid flows from the part of the cavity for the upper portion of the grille into another part of the cavity for the lower portion of the grille through yet other parts of the cavity for the inner portions of the grille.

The radiator grille provided in accordance with the second aspect of the present invention includes an upper portion, a lower portion, the inner portions having inner openings between those of the upper and the lower portions. Since the cavity of the molding die has a resistance to the flow of molten resin in the parts of the cavity for the upper and lower portions of the grille less than resistance to flow of the resin in the other parts of the cavity for the other portions of the grille, the resin flows better in the former parts than in the latter parts so that the resin does not stagnate or make a confluence in the former parts. As a result, a sink mark will not be generated on the upper and the lower portions. Therefore, the upper and the lower portions have a better appearance. In addition, since the upper, lower, and inner portions have internal openings, the radiator grill is less in weight. In sum, since the grille does not have the sink mark on the ornamental surface of the grille, the grille weighs less and has a better appearance than those of the prior art.

It is an object of the third aspect of the invention to provide a molded resin body having a good appearance by enabling a pressurized gas to reach the vicinity of the thinner end of a hollow slender part of the body and further enabling the quantity of the resin to be injected to be accurately and easily controlled.

The molded resin body is characterized in that the hollow slender part thereof tapers in the direction of the flow of the resin. The lower front part of the body has the form of the ornamentation molding portion of the inner surface of a molding die transferred thereto to make an ornamentation on that portion of the body. The ornamentation can be a flowery pattern, characters, symbols, a reflective plane or the like. An internal opening is made in the hollow slender part at the time of the molding of the body so that the front of the part is put into tight contact with the inner surface of the die on the cavity thereof by the pressurized gas in the opening.

It is important for the hollow slender part to taper in the direction of the molding flow of the resin. It is preferable for the diameter of the thinner end of the slender part to be equal to 20 to 80% of the diameter of the thicker end, which is located near the gate of the molding die. If the diameter of the thinner end is less than 20% of the diameter of the thicker end, the volume of the thinner end portion of the internal opening is likely to be too small for the resin to be pushed onto the inner surface of the die cavity by the pressure of the pressurized gas and make the molded resin body with a pleasing appearance. If the diameter of the thinner end is more than 80% of that of the thicker end, it is likely that the internal opening will not extend far enough to have the thinner end thereof near that of the slender part.

As stated above, this resin can be made from acrylonitrile-butadiene-styrene, polypropylene, polycarbonate, acrylonitrile-ethylene-propylene-diene-rubber-styrene or the like. The pressurized gas can be nitrogen gas, air or the like.

Other various molded resin bodies such as motor vehicle parts and interior parts may be provided in accordance with the present invention.

Since the hollow slender part of the molded resin body tapers as described above, the pressurized gas injected into the resin in the cavity of the molding die, at the time of molding, can reach the vicinity of the thinner end of the hollow slender part to push the resin onto the inner surface of the die cavity and transfer the form of the ornamentation molding to the inner surface to the body. The body is thus made good in appearance.

To mold the body, the molten resin is first injected into the cavity of the molding die so that the resin is cooled and solidified as it comes into contact with the inner surface of the die cavity. As a result, the outer layer of the body is made from solidified resin. The pressurized gas is then injected into the molten resin in the cavity so that the resin is pushed forward, and the internal opening is made. During this process, the speed of making the outer layer of the body is hardly affected by the form of the internal opening. The ratio of the cross-sectional area of the internal opening to that of the hollow slender part is smaller than in the case in which the cross-sectional area of such an internal opening is unchanged along the total length thereof. The volume of the internal opening depends on the quantity of the injected resin. If the cavity has the same capacity, these openings are nearly equal to each other in volume. For these reasons, the length of the tapering internal opening is larger than that of the other internal opening whose cross-sectional area is unchanged along the total length thereof. It is thus made possible, in accordance with the present invention, to provide a molded resin body with a good appearance by enabling the pressurized gas to reach the vicinity of the thinner end of the hollow slender part and controlling the quantity of resin to be injected into the cavity.

BRIEF DESCRIPTION OF THE DRAWINGS

FIG. 3 is a sectional view of a central lower portion of the frame of the grille of the first embodiment, which is molded on the weir.

FIG. 4 is a sectional view of the non-central lower portion of the frame, which is not molded on the weir.

FIG. 5 is a sectional view of the die along lines 5—5 shown in FIG. 2.

FIG. 6 is a sectional view of the die along lines 6—6 shown in FIG. 2.

FIG. 11 is a sectional view of the grille along line 11—11 shown in FIG. 12.

FIG. 12 is a front view of the grille of the second embodiment of the present invention.

FIG. 13 is a perspective view of the grille of FIG. 12 shown secured to the hood of a motor vehicle.

FIGS. 29, 30, 31, 32, 33 and 34 show a radiator grille which is a fourth embodiment of the present invention.

FIG. 29 is a rear view of the radiator grille of the fourth embodiment of the present invention.

FIG. 30 is sectional view of the grille along line 30—30 shown in FIG. 29.

FIG. 31 is sectional view of the grille along line 31—31 in FIG. 29.

FIG. 32 is sectional view of the grille along line 32—32 shown in FIG. 29.

FIG. 33 is sectional view of the grille along line 33—33 shown in FIG. 29.

FIG. 34 is sectional view of the grille along line 34—34 shown in FIG. 29.

DETAILED DESCRIPTION OF THE PREFERRED EMBODIMENT

A first embodiment of the present invention is hereafter described with reference to the drawings attached hereto.

Figure 1:
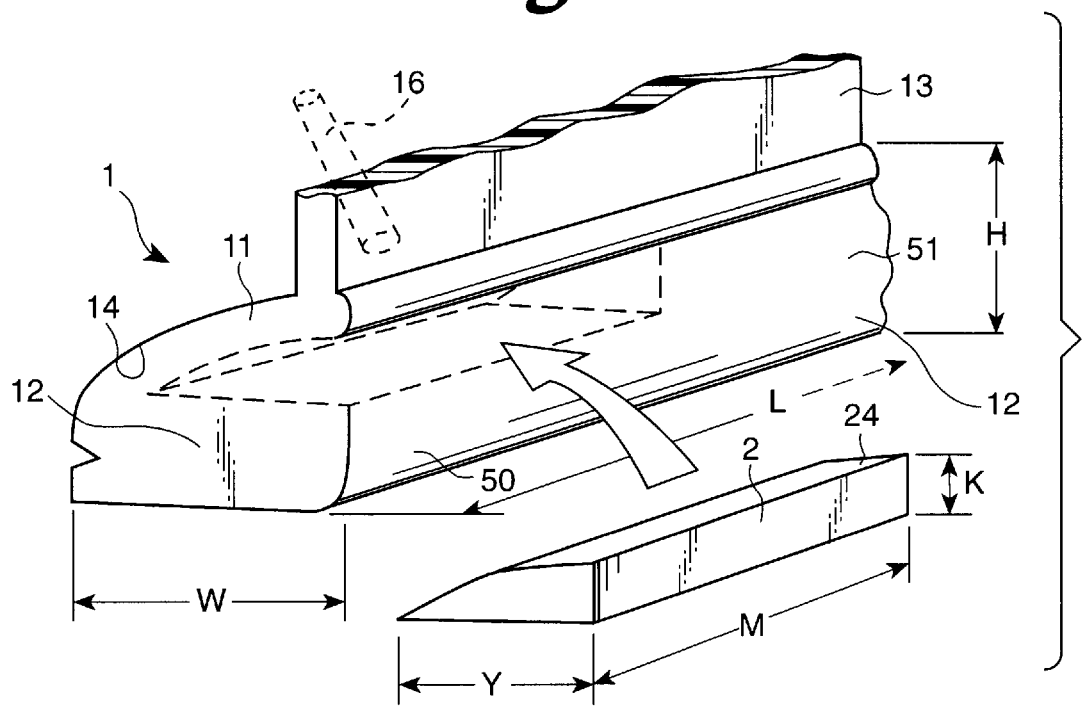
FIG. 1 is a view illustrating the internal opening portion of the cavity of a molding die and a weir for molding a radiator grille in a method. constituting a first embodiment of the present invention.
Figure 2:
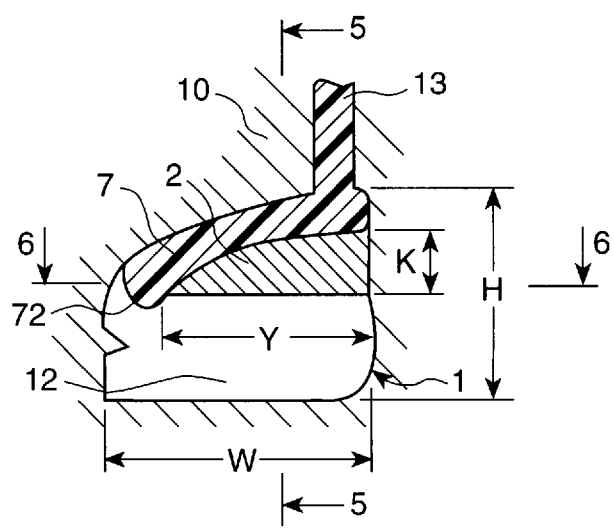
FIG. 2 is a sectional view of the opening portion of FIG. 1 wherein a resin is being injected into the cavity to mold the radiator grille.
Figure 7:
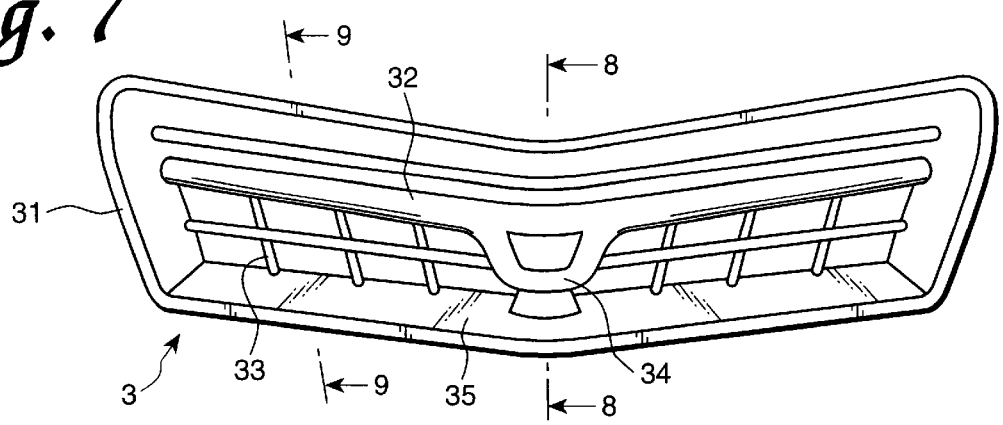
FIG. 7 is a perspective view of the grille according to the first embodiment of the present invention.
Figure 8:
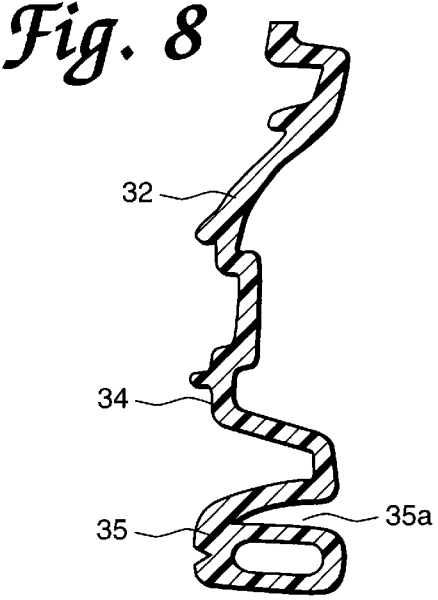
FIG. 8 is a sectional view of the grille along lines 8—8 shown in FIG. 7.
Figure 9:
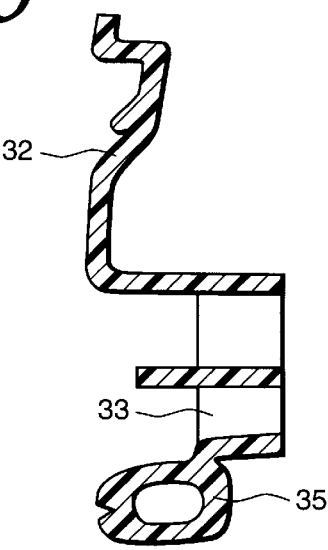
FIG. 9 is a sectional view of the grille along lines 9—9 shown in FIG. 7.
Figure 10:
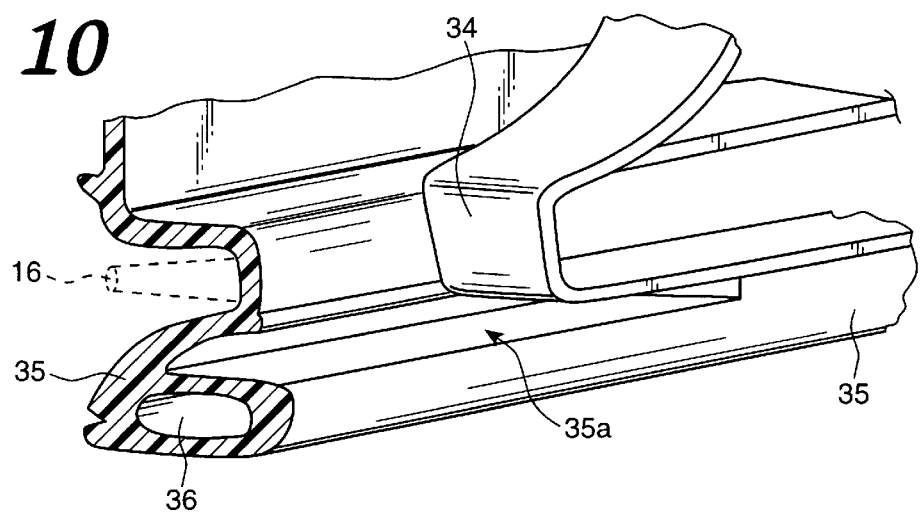
FIG. 10 is a partial perspective view of the grille at a recess formed by the weir of the first embodiment.

The first embodiment, as shown in FIGS. 7–10, is a method for molding a hollow body 3 which for illustrative purposes here is a radiator grille having a frame including a lower portion 35. The lower portion 35 has an internal opening 36, as shown in FIG. 10. For the molding process, a molding die 10 having a cavity 1 and a weir 2, as shown in FIGS. 1 and 2, is used. The weir 2 is provided in the central part of the lower internal opening portion 12 of the cavity 1 so that the weir extends in the longitudinal direction thereof. The weir 2 is located near the upstream side of the portion with respect to the direction of flow of resin 7 and a pressurized gas used in the process. To make the internal opening 36 as shown in FIG. 10, the molten resin 7 is injected into the cavity 1 of the molding die 10 through gate 16. Pressurized gas is thereafter injected into the still molten resin in the cavity.

The width Y, length M and maximum height K of the weir 2 are respectively equal to about 60% of the width W of the internal opening portion 12 of cavity 1, about 30% of length L of the opening portion, and about 30% of height H of the opening portion. The weir 2 has a curved top 24, which faces the curved top 14 of the opening portion 12. A gap (also referred to herein as a receiving region), 11 is defined between the curved tops 24 and 14 of the weir 2 and the portion 12, as shown in FIGS. 1, 2, 5 and 6.

The cavity 1 has an inflow passage 13 extending downstream towards the internal opening portion 12 and over the weir 2, as shown in FIG. 1. The gate 16 extends downstream to the inflow passage 13. The front portion 34 of the radiator grill 3 is molded from the resin provided in the passage 13.

To mold grille 3, molten resin 7 is injected into the cavity 1 of the molding die 10 through gate 16 so that the resin flows into the internal opening portion 12 of the cavity through the gap 11 between the respective tops 24 and 14 of the weir 2 and the opening portion 12 When resin 7 is injected, the leading portion 72 thereof first comes into contact with the weir 2 so that the flow of resin slows down before it enters into the opening portion (also referred to herein as the main body region) 12 through the gap 11, as shown in FIG. 2. Since the cross-sectional area of the upstream part 50 of the portion 12, at which the weir 2 is provided, is smaller than that of the downstream part 51, at which the weir is not provided (see FIG. 1), the resin 7 comes into uniform contact with the inner surface of die 10 on the upstream part as the resin flows from the upstream part to the downstream part in the longitudinal direction of the opening portion 12 In addition, when the resin has reached the downstream end of die 10, the downstream end portion of weir 2 causes the resin 7 to flow evenly and uniformly over the inner surface of the downstream end so that no flow mark is created. Since the weir 2 is provided in the manner described, a very precisely and evenly formed internal opening 36 is formed. The resin is gradually cooled and solidified on the inner surface of die 10 and then further solidifies inwardly toward the center of opening portion 12. Since the resin 7 is uniformly cooled and solidified on the surface of opening portion 12 before the pressurized gas is injected into the molten resin, the internal opening 36 can be made in the central part of the opening portion by the injection of the gas into the resin.

FIG. 3 shows the lower portion 35 of the frame towards the center of the radiator grill 3, which is molded in the internal opening portion 12 of the molding die 10 with use of weir 2. FIG. 4 shows the lower portion 35 of the frame at the outer portions of the grille 3, which is molded in the opening portion 12 without the weir 2. These drawings show that the internal opening 36 is made in the radially central parts in both the central and non-central portions of lower portion 35, and each of the central and non-central portions are nearly uniform in thickness around the opening. The central lower portion 35 has a recess 35a formed by the weir 2. As shown by FIGS. 1 and 3, in this embodiment the internal hollowed portion or opening 36 is formed only on a downstream side of the weir 2 relative to the gate 16.

As shown in FIGS. 7–10, radiator grille 3 includes a frame having side portions 31, an upper portion 32, a lower portion 35, an inner portion 33, and a central front portion 34 for ornamentation. The recess 35a of the lower portion 35 is located both under and behind the central front portion 34 as shown in FIG. 8, which is a sectional view of grille 3 taken along lines 8—8 in FIG. 7. The gate 16 for injecting the resin 7 and the pressurized gas into the cavity 1 of the molding die 10 is provided at a part of the cavity which corresponds to the central part of the radiator grille 3, as shown in FIG. 10. FIG. 9 is a sectional view of the grille 3 taken along lines 9—9 shown in FIG. 7. As can be seen, FIG. 9 does not show the recess 35a as it is a sectional view taken off center of the grille where such recess does not exist. However, the lower portion 35 is nearly uniform in thickness around all portions of the internal opening 36.

In the method described above, since the molten resin 7 comes into uniform contact with the inner surface of the molding die 10 as the resin flows in the cavity, the grille 3 is not produced with a defective appearance such as a flow streak.

Shown in the above-described drawings are cavity 1, molding die 10, gap 11, internal opening portion 12, weir 2, radiator grille 3, central front portion 34, lower portion 35 of the frame of the grille, an internal opening 36, a resin 7, and a leading portion 72 of the resin.

Figure 24A:
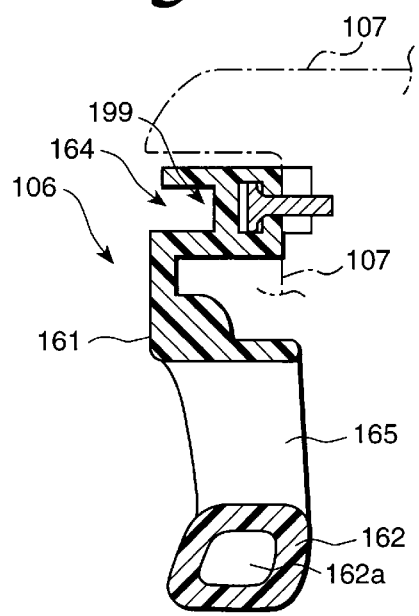
FIG. 24(a) is a sectional view of a radiator grille taken along lines 24(a)—24(a) shown in FIG. 25 in an example of the related art of the present invention.
Figure 24B:
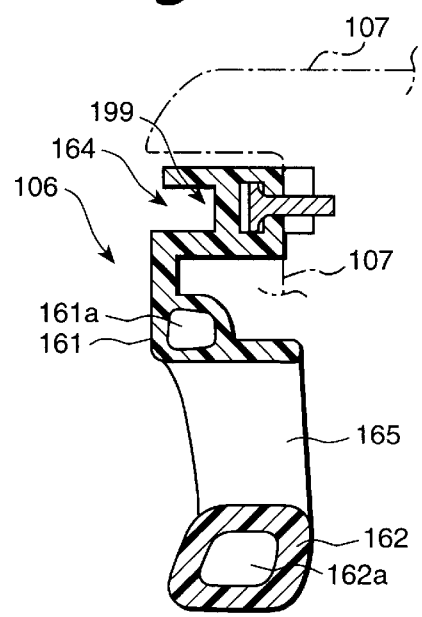
FIG. 24(b) is a sectional view of a radiator grille in another example of the related art of the present invention.
Figure 25:
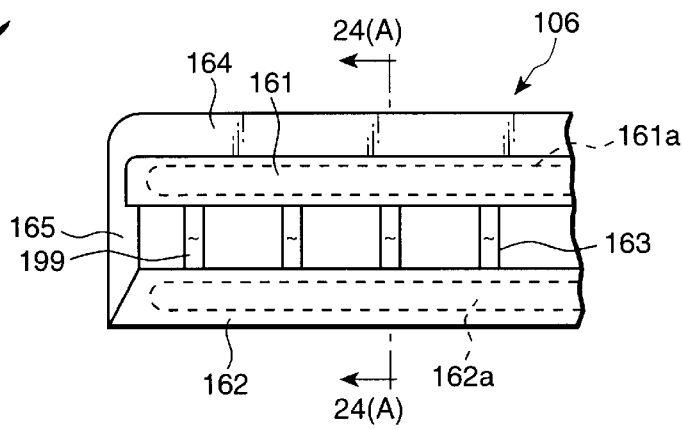
FIG. 25 is a partial front view of the conventional radiator grille illustrating the problems associated therewith.
Figure 26:
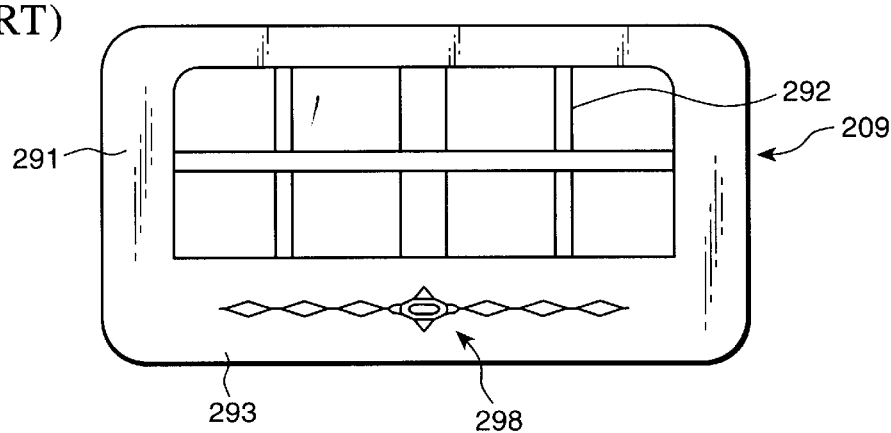
FIG. 26 is a front view of another conventional radiator grille.
Figure 27:
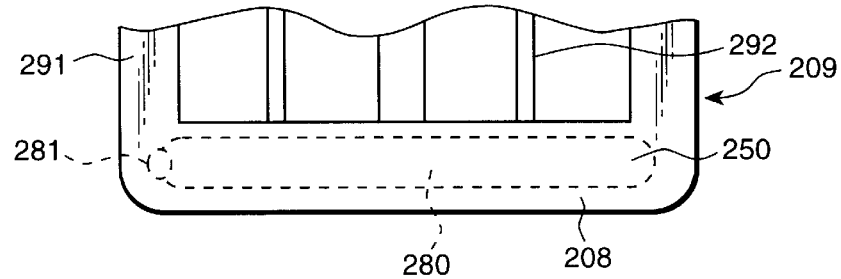
FIG. 27 is a partial rear view of the conventional grille shown in FIG. 26.
Figure 28:
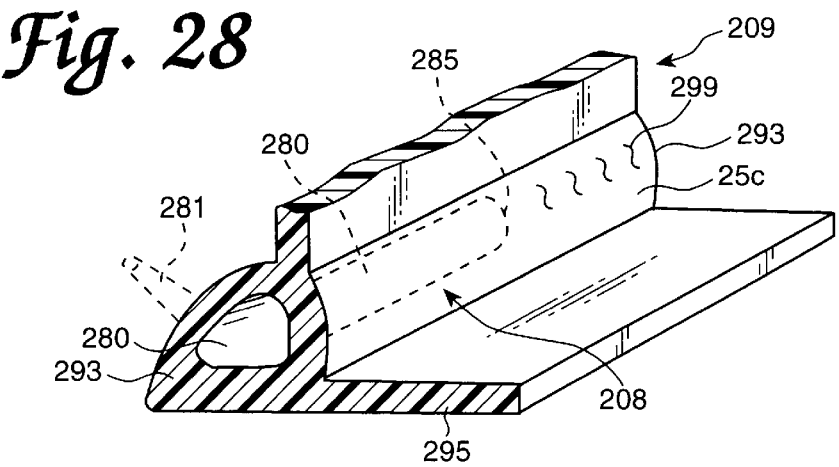
FIG. 28 is a cutaway perspective view of the hollow slender part of the conventional grille shown in FIG. 26.

Another problem with conventional radiator grilles exists. As shown in FIGS. 24(a) and 25, in order to eliminate problems associated with weight, the conventional radiator grille made of resin might conceivably have an internal opening 162a in the lower portion 162 of the grille. However, this solution in and of itself is insufficient. Shown at 164 and 165 in FIGS. 24(a) and 25 are a securing portion and a side portion, respectively. The radiator grille 106, having the internal opening 162a in the lower portion 162, has a problem in that an inner portion between the upper portion 161 and the lower portion 162 of the grille is likely to have a sink mark produced on the ornamental surface of the lower portion so as to have a poor appearance. In addition the grille is still relatively heavy because the internal opening is small in comparison with the entire size of the grille. To remedy the problems associated with excessive weight of the grille, it is also conceivable for a radiator grille to be made of resin and have internal openings 161a and 162a in the upper and lower portions 161 and 162 of the grille, respectively, as shown in FIG. 24(b).

The second embodiment of the present invention further develops the above-mentioned considerations. The second embodiment of the present invention is hereafter described with reference to the drawings attached hereto.

Figure 11:
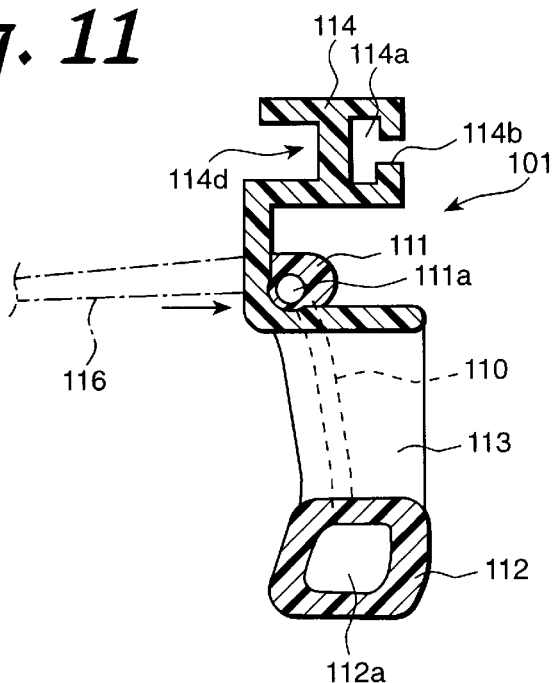
FIGS. 11, 12 and 13 show a radiator grille which is a second embodiment of the present invention.
Figure 12:
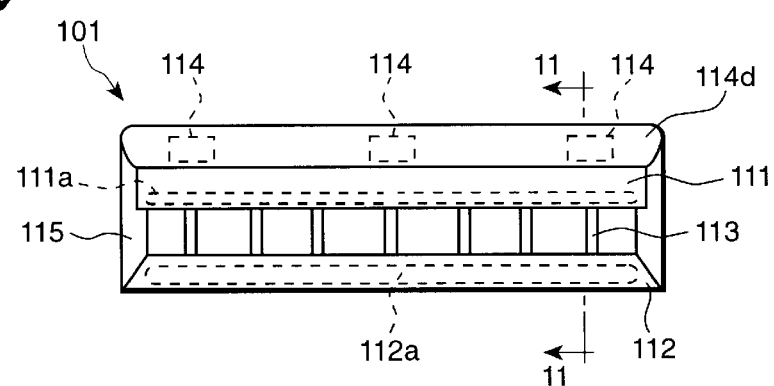

FIGS. 11 and 12 show a radiator grille 101. The grille 101 includes inner portions 113, an upper portion 111 located above the inner portions 113 and having an internal opening 111a, and a lower portion 112 located under the inner portions 113 and having an internal opening 112a. The inner portions 113 have internal openings 110 communicating with openings 111a and 112a of the upper and lower portions 111 and 112.

When the radiator grille 101 is molded from resin, the upper portion 111 is located near a gate 116 for injecting the resin and a pressurized gas into the cavity of a molding die. The grille 101 also includes an upper ornamental portion 114d located above the upper portion 111, securing portions 114 located above the upper portion and having securing holes 114a and pin holes 114b, and side portions 115 located at both the ends of the upper and lower portions 111 and 112. The side portions 115 couple upper and lower portions 111 and 112 to one another. The inner portions 113 are vertical rods extending parallel to the side portions 115.

To mold the grille 101, the molten resin is first injected into the cavity of the molding die through the gate 116. The pressurized gas, which is nitrogen gas, is then injected into the molten resin through gate 116 so that the internal openings 110, 111a and 112a are formed in the inner portions 113, upper portion 111 and lower portion 112, respectively. The openings 110 are formed as the gas flows from opening 111a to opening 112a. The grille 101 is thus molded from resin.

Figure 13:
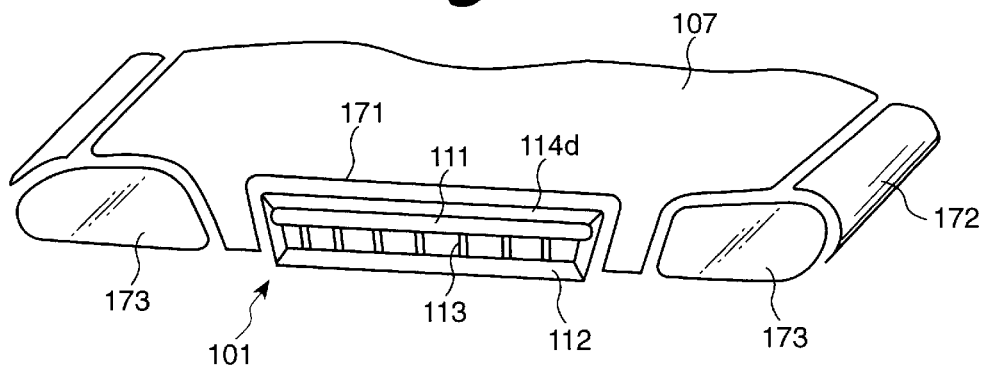

As shown in FIG. 13, radiator grille 101 is secured to the front end 171 of hood 107 of a motor vehicle having fenders 172 and headlights 173. The grille 101 is moved up and down when the hood 107 is opened and closed.

Since the upper and lower portions 111 and 112 of the grille 101 have internal openings 111a and 112a, the grille is enhanced in rigidity as a whole. Since the inner portions 113 have internal openings 110 communicating with internal openings 111a and 112a of the upper and lower portions 111 and 112, the molten resin in the cavity of the molding die is pushed by the pressurized gas when the internal openings are formed so that the resin flows better in the upper and the lower portions of the cavity than in the other parts of the cavity. This is because the resistance to flow of resin in the former parts is less than that in the latter parts. For that reason, the molten resin does not stagnate or make a confluence in the former parts. As a result, a sink mark is not formed on the upper and the lower portions 111 and 112, which thus have a pleasing appearance when formed. Additionally, since the upper portion 111, the lower portion 112 and the inner portions 113 have internal openings 111a, 112a and 110, respectively, the grille 101 has less weight.

A third embodiment of the present invention is hereafter described with reference to the drawings attached hereto.

Figure 14:
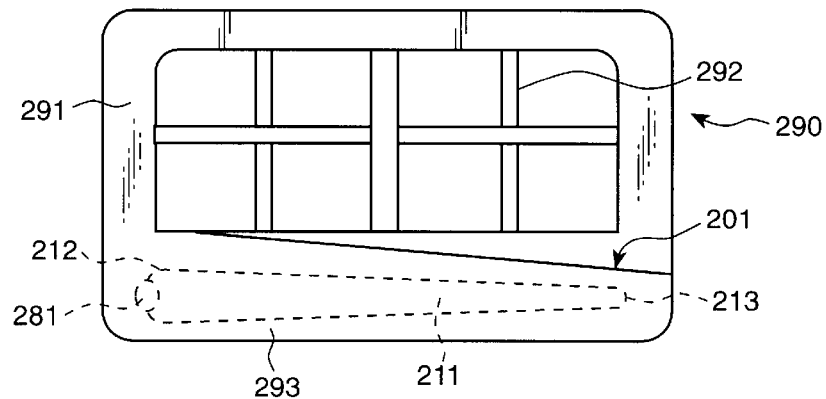
FIG. 14 is a rear view of a radiator grille which is a third embodiment of the present invention.
Figure 15:
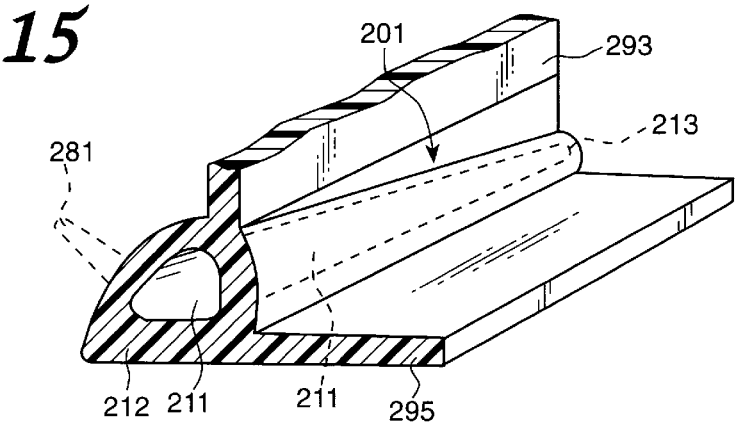
FIG. 15 is a cutaway perspective view of the hollow slender part of the grille of FIG. 14.

FIGS. 14 and 15 show a radiator grille 290 which has a molded resin body. The grille 290 includes an inner portion 292, and a frame having side portions 291 and a lower portion 293. The lower portion 293 has a hollow slender part 201 which forms part of the lower front part of the lower portion 293 and tapers in the direction of the flow of resin when forming the grille 290. The hollow slender part 201 has an internal opening 211 tapering in the same direction as the hollow slender part. As can be appreciated from FIGS. 15 and 16, die 203 for molding the grille 290 has a gate 281 for sequentially injecting resin and a pressurized gas into the cavity of the die. The gate 281 is located near the thicker end 212 of the hollow slender part 201. The thicker end 212 is located near one end of the lower portion 293 of the grille frame, and the thinner end 213 of the hollow slender part 201 is located near the opposite end of the lower portion 293.

Figure 16A:
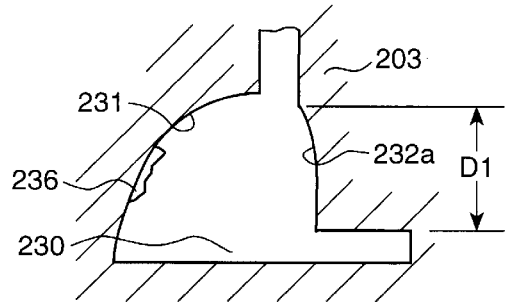
FIGS. 16(A)–16(C) are sectional views of a molding die for the grille which illustrate the hollow slender part of the die cavity in the third embodiment.
Figure 16B:
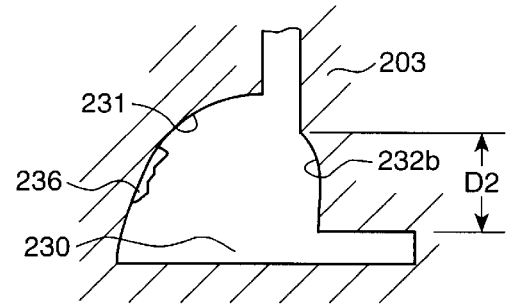
Figure 16C:
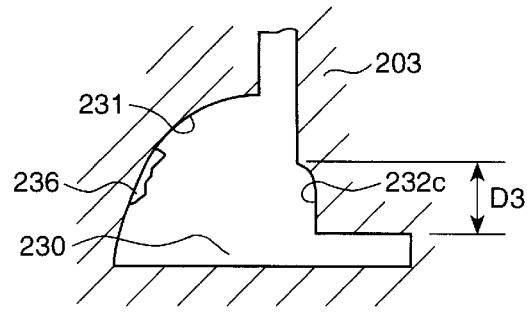
Figure 17:
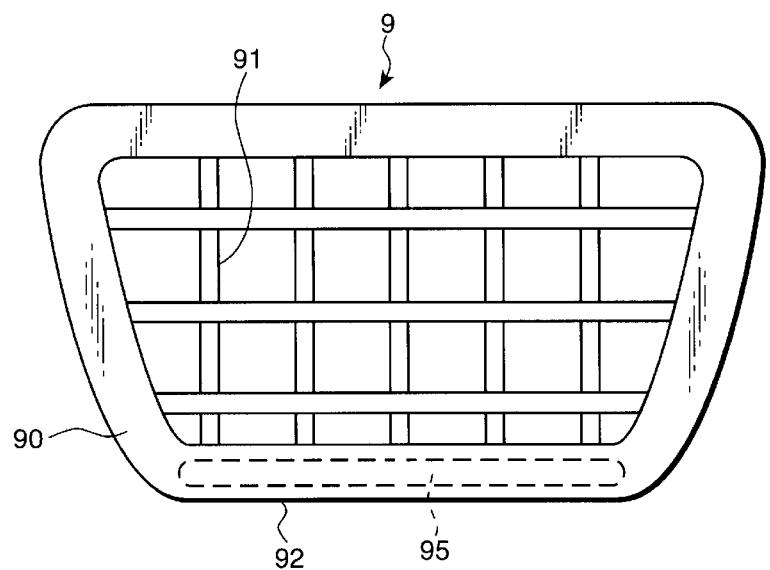
FIG. 17 is a view illustrating a conventional radiator grille.
Figure 18:
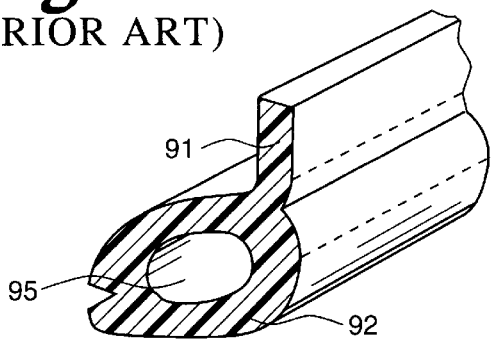
FIG. 18 is a cutaway view of the lower portion of the frame of the conventional grille.
Figure 19:
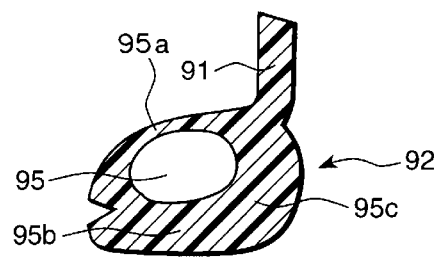
FIG. 19 is a sectional view of the lower portion of the frame of the conventional grille as improperly molded.
Figure 20:
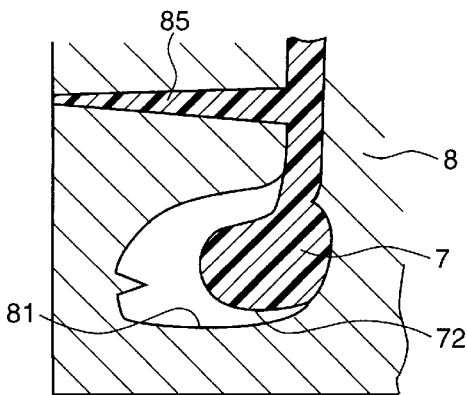
FIG. 20 is a view to illustrate the injection of a resin into the internal opening portion of the cavity of a conventional molding die.
Figure 21:
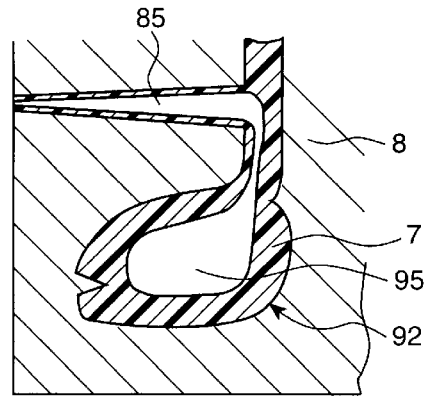
FIG. 21 is a view illustrating the formation of an internal opening in the conventional die.
Figure 22:
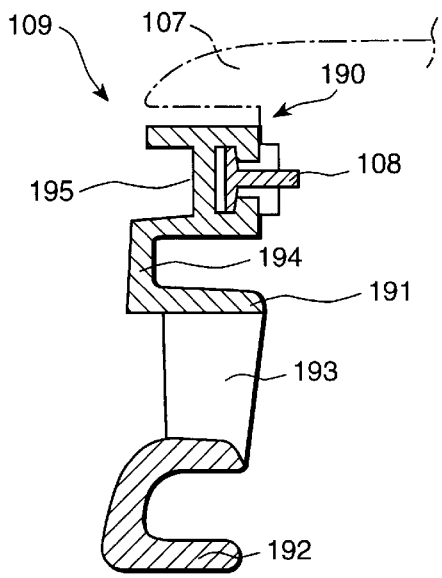
FIG. 22 is a sectional view of a conventional radiator grille along lines 22—22 shown in FIG. 23.
Figure 23:
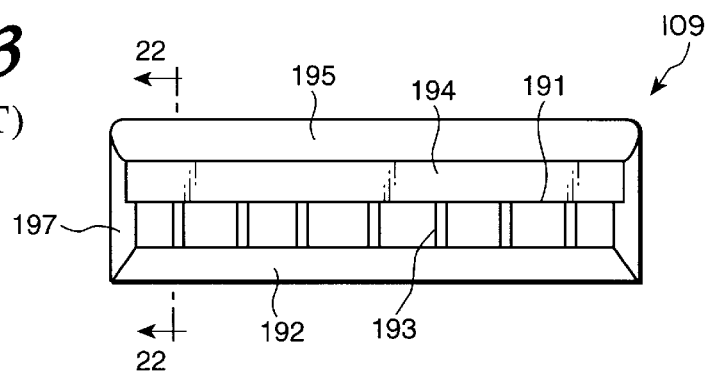
FIG. 23 is a front view of the conventional grille.

As shown in FIGS. 16(A)–16(C), the cross-sectional form of the molding portion 230 of the molding die 223 for hollow slender part 201 gradually changes in order to mold the hollow slender part 201 into tapered form. The molding portion 230 has a front wall 231 for forming the front surface of the lower portion 293 of the grille frame, and a rear wall shown progressively as numerals 232a, 232b and 232c in FIGS. 16(A–C) for forming the tapering rear surface of the hollow slender part 201. The front wall 231 has an ornamentation molding portion 236. While cross-sectional form of the front wall 231 remains unchanged along the total length thereof, as shown in FIGS. 16(A–C), so that the cross-sectional form of the front of the lower portion 293 remains unchanged along its length, the cross-sectional form of the rear wall, shown as 232a, 232b and 232a gradually changes along the total length thereof, so that the hollow slender part 201 tapers. The height D1 of the rear wall shown as 232c, operates to form the thicker end portion of the hollow slender part 201 and is larger than height D2 of the rear wall at portion 232b of the wall, which is used to form the intermediate portion of the hollow slender part 201. At the same time, this intermediate portion 232b of the rear wall has its height being larger than the height of portion 232c of the rear wall, which is used to form the thinner end portion of the hollow slender part 201. The height D3 of the thinner end of the hollow slender part 201 is equal to about 30% of the height D1 of the thicker end thereof.

Since the hollow slender part 201 tapers, the pressurized gas injected into the resin at the time of the molding of the grille 290 is able to reach the thinner end of the part and push the resin completely and evenly onto the inner surface of the molding die 203. Thus the form of the ornamentation molding portion 236 is accurately transferred to the surface of the lower portion 293 of the grille frame. Therefore, the grille 290 has a good appearance.

Since the internal opening 211 tapers, the ratio of the cross-sectional area thereof to that of the hollow slender part 201 is relatively small, but the length of the opening is relatively large.

For comparison, a radiator grille was actually molded by a molding die having a hollow slender part molding portion with a cross-sectional form which was unchanged along its total length of the molding portion. The cross-section area was made to be the same as that of the thicker end 212 of the hollow slender part. It turned out that the height of the internal opening of the hollow slender part of the grille was equal to only about 70% of the total height of the hollow slender part, and the ornamentation formed on the surface of the lower portion of the frame of the grille was not accurately formed downstream of the leading end of the opening. Therefore, the radiator grille 290 of the present invention is higher in quality than that just described.

A fourth embodiment of the present invention is hereafter described with reference to the drawings attached hereto.

As shown in FIGS. 29–34, the radiator grille 303 includes a frame having side portions 331, an upper portion 332, a lower portion 335, a middle portion 333, and a central portion 334 for ornamentation. A recess 336 in the lower portion 335 is disposed underneath and behind the central portion 334. The recess 336 is formed by utilizing the weir 2 according to the first embodiment of the molding method of the present invention, as shown in FIGS. 1 and 2. The gate 316 for injecting resin and pressurized gas into the cavity of the molding die is provided at the part of the cavity which corresponds to the central part of the radiator grille 303, as shown in FIGS. 29 and 30.

Further, as shown in FIG. 29, an internal opening 334a of the central portion 334 communicates with the internal openings 332a, 333a and 335a of the upper, middle and lower portions 332, 333 and 335, respectively. As described in the second embodiment of the present invention, in order to mold the grille 303, the molten resin is first injected into the cavity of the molding die through the gate 316.

Pressurized gas, which is nitrogen gas, is then injected into the molten resin through gate 316 so that the internal openings 332a, 333a, 334a and 335a are formed in the upper portion 332, the middle portions 333, the central portion 334, and the lower portion 335, respectively. At that time, the openings 334a are made as the gas flows from opening 332a to opening 335a. The grille 303 is thus molded from the resin.

Since the upper, middle and lower portions 332, 333 and 335 of grille 303 have internal openings 332a, 333a and 335a, respectively, the grille is enhanced in rigidity as a whole. Since the central portion 334 has internal openings 334a communicating with openings 332a, 333a and 335a of the upper, middle and the lower portions 332, 333 and 335, the molten resin in the cavity of the molding die is more easily pushed by the pressurized gas, when the internal openings are formed, and the resin flows better in the upper and lower parts of the cavity, forming the upper and the lower portions 332 and 335, than in the other parts of the cavity. This is because these portions of the cavity are wider and have less resistance to the flow of resin. For that reason, the molten resin does not stagnate or make a confluence in the upper and lower parts. As a result, a sink mark is not generated on the upper, middle and the lower portions 332, 333 and 335, and such portions are formed with a good appearance. In addition, since the upper portion 332, the middle portion 333, the lower portion 335 and the central portion 334 have internal openings 332a, 333a, 335a and 334a, respectively, the grille 303 is lighter in weight.

Furthermore, as shown in the sectional view of FIGS. 31, 32 and 33 and the rear view of FIG. 29, each of the internal openings 332a, 333a and 335a are tapered in the direction of the molding flow of resin for the grille 303 in accordance with the third embodiment of the present invention. Thus, pressurized gas injected into the resin in the cavity of the molding die at the time of formation of the grille 303 is able to reach the vicinity of the thinner ends of the cavity and push the resin onto the entire inner surface of the cavity to accurately transfer the form of the ornamentation molding portion of the inner surface onto the body. The body is thus made to have a good appearance.

FIG. 30 is a sectional view of the grille 303 along lines 30—30 shown in FIG. 29, and shows the recess 336 of the lower portion 335 of the frame of the grille. FIGS. 31–33 are sectional views of the grille 303 along lines 31—31, 32—32, and 33—33, respectively, as shown in FIG. 29, and do not show the recess 336. The upper portion 332 is nearly uniform in thickness around the internal opening 333a, the middle portion 33 is nearly uniform in thickness around the internal opening 333a, and the lower portion 335 is nearly uniform in thickness around the internal opening 335a.

The radiator grille 303 can thus be molded in the method according to the present invention.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for molding a body having an internal hollow portion, said method comprising the steps of:

molding a body by flowing resin through an injection gate and into a mold having an entrance port associated with the injection gate and an inner mold surface defining a cavity, the mold comprising a weir which extends laterally over an upstream region of the cavity so as to be coextensive in length with the upstream region, yet not over a downstream region of the cavity laterally spaced from the entrance port and laterally adjacent the weir, the weir dividing the upstream region of the cavity into a receiving region and a main body region in communication with and disposed below and downstream from the receiving region, the receiving region being disposed below the entrance port and above the weir; and pressurizing the cavity with gas to form an internal hollow portion in a portion of the body molded in the downstream region and the main body region, yet not in another portion of the body molded in the receiving region, wherein the weir is disposed in proximity to the entrance port to intercept resin flowing through the entrance port; and wherein the weir is constructed and arranged to pass the resin along a downward direction from the receiving region to the main body region, so that, at least during a portion of the process, the resin follows a path in which it passes evenly and uniformly over an end surface portion of the weir and through the main body region before flowing laterally into the downstream region and thereby solidifies uniformly on the inner mold surface so that no flow mark is created.

2. A method according to claim 1, wherein the weir has a width equal to about 8% to about 60% of a width of the upstream region.

3. A method according to claim 1, wherein the weir has a width equal to about 25% to about 75% of a width of the upstream region.

4. A method according to claim 1, wherein the weir has a maximum height equal to about 30% of a maximum height of the upstream region.

5. A method according to claim 1, wherein the resin is a member selected from the group consisting of polypropylene resin, acrylonitrile-butadiene-styrene resin, a polycarbonate resin, and acrylonitrile-ethylenepropylene-rubber-styrene resin.

6. A method according to claim 1, wherein the downstream region tapers along a lateral direction in which the resin flows therethrough during said flowing step.

7. A method for molding a body having an internal hollow portion, said method comprising the steps of:

molding a body-by flowing resin through an injection gate and into a mold having an entrance port associated with the injection gate and an inner mold surface defining a cavity, the mold comprising a weir which extends laterally over an upstream region of the cavity so as to be coextensive in length with the upstream region, yet not over first and second downstream regions of the cavity laterally spaced from the entrance port and disposed laterally on opposite sides of the weir, the weir dividing the upstream region of the cavity into a receiving region and a main body region in communication with and disposed below and downstream from the receiving region, the receiving region being disposed below the entrance port and above the weir; and pressurizing the cavity with gas to form an internal hollow portion in a portion of the body molded in the first and second downstream regions and the main body region, yet not in another portion of the body molded in the receiving region, wherein the weir is disposed in proximity to the entrance port to intercept resin flowing through the entrance port; and wherein the weir is constructed and arranged to pass the resin along a downward direction from the receiving region to the main body region, so that, at least during a portion of the process, the resin follows a path in which it passes evenly and uniformly over end surface portions of the weir and through the main body region before flowing laterally into the first and second downstream regions and thereby solidifies uniformly on the inner mold surface so that no flow mark is created.

8. A method according to claim 7, wherein the weir has a width equal to about 8% to about 60% of a width of the upstream region.

9. A method according to claim 7, wherein the weir has a width equal to about 25% to about 75% of a width of the upstream region.

10. A method according to claim 7, wherein the weir has a maximum height equal to about 30% of a maximum height of the upstream region.

11. A method according to claim 7, wherein the resin is a member selected from the group consisting of polypropylene resin, acrylonitrile-butadiene-styrene resin, a polycarbonate resin, and acrylonitrile-ethylenepropylene-rubber-styrene resin.

12. A method according to claim 7, wherein each of the downstream regions tapers along a lateral direction in which the resin flows therethrough during said flowing step.

* * * * *